United States Patent
Hu et al.

(10) Patent No.: US 11,049,188 B2
(45) Date of Patent: Jun. 29, 2021

(54) BLOCKCHAIN-BASED SERVICE EXECUTION METHOD AND APPARATUS, AND ELECTRONIC DEVICE

(71) Applicant: Advanced New Technologies Co., Ltd., Grand Cayman (KY)

(72) Inventors: Danqing Hu, Hangzhou (CN); Shaorong Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/752,248

(22) Filed: Jan. 24, 2020

(65) Prior Publication Data

US 2020/0160454 A1 May 21, 2020

Related U.S. Application Data

(63) Continuation of application No. 16/370,317, filed on Mar. 29, 2019, now Pat. No. 10,719,884.

(30) Foreign Application Priority Data

Mar. 30, 2018 (CN) .......................... 201810277604.9

(51) Int. Cl.
*G06Q 40/00* (2012.01)
*G06Q 40/08* (2012.01)
(Continued)

(52) U.S. Cl.
CPC ............. *G06Q 40/08* (2013.01); *G06F 16/27* (2019.01); *G06F 16/51* (2019.01); *G06Q 20/223* (2013.01);
(Continued)

(58) Field of Classification Search
CPC .................................................. G06Q 40/00
(Continued)

(56) References Cited

U.S. PATENT DOCUMENTS 6,310,966 B1 10/2001 Dulude et al.
9,610,476 B1 4/2017 Tran et al.
(Continued)

FOREIGN PATENT DOCUMENTS

CA 2931469 9/2017
CN 106529946 3/2017
(Continued)

OTHER PUBLICATIONS

Just-Auto.com [online], "Toyota Explores 'Blockchain' for Driverless Cars Data", Aroq Ltd. Aroq House, May 2017, retrieved on Mar. 3, 2020, retrieved from URL <https://www.just-auto.com/news/toyota-explores-blockchain-for-driverless-cars-data_id176727.aspx>, 1 page.

(Continued)

*Primary Examiner* — Ojo O Oyebisi
(74) *Attorney, Agent, or Firm* — Fish & Richardson P.C.

(57) ABSTRACT

Appearance data of a target entity is collected as appearance data, where the target entity comprises a physical entity capable of accessing, as a member, a blockchain. The appearance data is registered in a distributed database associated with the blockchain as an identity of the target entity. A target transaction initiated by a member node device in the blockchain is received, where the target transaction comprises the appearance data of the target entity that is collected by the member node device and a service event that is related to the target entity and that is detected by the member node device. A smart contract that corresponds to the service event is invoked. Based on the identity indicated by the appearance data of the target entity, service logic stated in the smart contract is executed.

30 Claims, 3 Drawing Sheets

(51) Int. Cl.
  *G06F 16/27* (2019.01)
  *G06F 16/51* (2019.01)
  *G06Q 50/30* (2012.01)
  *G06Q 50/18* (2012.01)
  *G06Q 20/22* (2012.01)
  *G06Q 50/26* (2012.01)

(52) U.S. Cl.
  CPC .......... *G06Q 50/182* (2013.01); *G06Q 50/26* (2013.01); *G06Q 50/30* (2013.01)

(58) Field of Classification Search
  USPC .......................................................... 705/4
  See application file for complete search history.

(56) References Cited

U.S. PATENT DOCUMENTS

| | | | |
|---|---|---|---|
| 9,998,286 | B1 | 6/2018 | Ramathal et al. |
| 10,719,884 | B2 | 7/2020 | Hu et al. |
| 2004/0162786 | A1 | 8/2004 | Cross et al. |
| 2007/0234058 | A1 | 10/2007 | White |
| 2009/0313129 | A1 | 12/2009 | Rothschild |
| 2015/0332283 | A1 | 11/2015 | Witchey |
| 2016/0055422 | A1 | 2/2016 | Li et al. |
| 2016/0098730 | A1 | 4/2016 | Feeney |
| 2017/0046709 | A1 | 2/2017 | Lee et al. |
| 2017/0046806 | A1 | 2/2017 | Haldenby et al. |
| 2017/0147808 | A1 | 5/2017 | Kravitz |
| 2017/0173262 | A1 | 6/2017 | Veltz |
| 2017/0178417 | A1 | 6/2017 | Bekas et al. |
| 2017/0220998 | A1 | 8/2017 | Horn et al. |
| 2017/0232300 | A1 | 8/2017 | Tran et al. |
| 2017/0352012 | A1 | 12/2017 | Hearn et al. |
| 2017/0353309 | A1 | 12/2017 | Gray |
| 2018/0018723 | A1 | 1/2018 | Nagla et al. |
| 2018/0094953 | A1 | 4/2018 | Colson et al. |
| 2018/0096175 | A1 | 4/2018 | Schmeling et al. |
| 2018/0108024 | A1 | 4/2018 | Greco |
| 2018/0109516 | A1 | 4/2018 | Song et al. |
| 2018/0117446 | A1* | 5/2018 | Tran ..................... A42B 3/0433 |
| 2018/0158054 | A1 | 6/2018 | Ardashev et al. |
| 2018/0218343 | A1 | 8/2018 | Kolb et al. |
| 2018/0260909 | A1 | 9/2018 | Li |
| 2018/0276626 | A1 | 9/2018 | Laiben |
| 2018/0285810 | A1 | 10/2018 | Ramachandran et al. |
| 2018/0285879 | A1 | 10/2018 | Gadnis et al. |
| 2018/0343114 | A1 | 11/2018 | Ben-Ari |
| 2019/0013943 | A1 | 1/2019 | Maim |
| 2019/0080284 | A1 | 3/2019 | Kim et al. |
| 2019/0102850 | A1 | 4/2019 | Wheeler et al. |
| 2019/0114584 | A1 | 4/2019 | Toohey et al. |
| 2019/0156429 | A1 | 5/2019 | Beckmann et al. |
| 2019/0165949 | A1 | 5/2019 | Ramos et al. |
| 2019/0166101 | A1 | 5/2019 | Ramos et al. |
| 2019/0172059 | A1 | 6/2019 | Castagna et al. |
| 2019/0172282 | A1 | 6/2019 | Patel |
| 2019/0179939 | A1 | 6/2019 | Govindarajan et al. |
| 2019/0207749 | A1 | 7/2019 | McKellar et al. |
| 2019/0207751 | A1 | 7/2019 | Harvey |
| 2019/0215149 | A1 | 7/2019 | Ramasamy et al. |
| 2019/0304027 | A1 | 10/2019 | Hu et al. |
| 2019/0370905 | A1 | 12/2019 | Hu |
| 2020/0175605 | A1 | 6/2020 | Hu et al. |

FOREIGN PATENT DOCUMENTS

| | | |
|---|---|---|
| CN | 106845210 | 6/2017 |
| CN | 107045650 | 8/2017 |
| CN | 107135661 | 9/2017 |
| CN | 107341676 | 11/2017 |
| CN | 107516180 | 12/2017 |
| CN | 107682331 | 2/2018 |
| CN | 107707633 | 2/2018 |
| CN | 107770159 | 3/2018 |
| CN | 107835166 | 3/2018 |
| CN | 108009834 | 5/2018 |
| JP | 2018036893 | 3/2018 |
| TW | M554608 | 1/2018 |
| WO | WO 2011125037 | 10/2011 |
| WO | WO 2017023290 | 2/2017 |
| WO | WO 2017066002 | 4/2017 |
| WO | WO 2017165909 | 10/2017 |
| WO | WO 2017190794 | 11/2017 |
| WO | WO 2018014123 | 1/2018 |
| WO | WO 2018026807 | 2/2018 |

OTHER PUBLICATIONS

Cohn et al., "Smart After All: Blockchain, Smart Contracts, Parametric Insurance, and Smart Energy Grids," Georgetown Law Technology Review 273, 2017, 1(2):273-304.

Crosby et al., "BlockChain Technology: Beyond Bitcoin," Sutardja Center for Entrepreneurship & Technology Technical Report, Oct. 16, 2015, 35 pages.

Developer.ibm.com [online], "Use Vehicle Sensor Data to Execute Smart Transactions in Blockchain," Jun. 5, 2017, retrieved on Jun. 17, 2019, retrieved from URL<https://developer.ibm.com/articles/cl-blockchain-for-cognitive-iot-apps2/>, 22 pages.

Extended European Search Report in European Application No. 19727820.3 dated Feb. 7, 2020, 8 pages.

Extended European Search Report in European Patent Application No. 19725264.6, dated Dec. 10, 2019, 11 pages.

Gatteschi et al., "Blockchain and Smart Contracts for Insurance: Is the Technology Mature Enough?," Future Internet, MDPI, 2018, 16 pages.

Gatteschi et al., "To Blockchain or Not to Blockchain: That is the Question," IT Professional, IEEE Computer Society, 2018, 13 pages.

Hans et al., "Blockchain and Smart Contracts: Disruptive Technologies for the Insurance Market," 23rd Americas Conference on Information Systems, 2017, 10 pages.

Leiding et al., "Self-managed and blockchain-based vehicular ad-hoc networks," Pervasive and Ubiquitous Computing, Sep. 2016, pp. 137-140.

Nakamoto, "Bitcoin: A Peer-to-Peer Electronic Cash System," www.bitcoin.org, 2005, 9 pages.

PCT International Search Report and Written Opinion in International Application No. PCT/US2019/024070, dated Jun. 11, 2019, 7 pages.

PCT International Search Report and Written Opinion in International Application No. PCT/US2019/034262, dated Aug. 15, 2019, 6 pages.

Raikwar et al., "A Blockchain Framework for Insurance Processes," 2018 9th IFIP International Conference on New Technology Mobility and Security (NTMS), IEEE, 2018, 4 pages.

Yuan et al., "Towards Blockchain-based Intelligent Transportation Systems," 2016 IEEE 19th International Conference on Intelligent Transportation Systems, Nov. 2016, pp. 2663-2668.

Baek, "Ford Car, "Cryptocurrency Utilization, Traffic Congestion" . . . Patent Degrees", The Bchain, Mar. 29, 2018, 4 pages (with machine translation).

sktinsight.com [online], "Blockchain authentication replaces inconvenience with convenience", Jan. 15, 2018, retrieved on Jul. 2, 2019, retrieved from URL <https://www.sktinsight.com/99856>, 8 pages (with machine translation).

U.S. Appl. No. 16/752,345, Hu et al., filed Jan. 24, 2020.

U.S. Appl. No. 16/424,853, Hu, filed May 29, 2019.

Mckinsey.com [online], "Blockchain in insurance-opportunity or threat?" McKinsey & Company, Insurance, Jul. 2016, Internet URL:<https://www.mckinsey.com/~/media/mckinsey/industries/financial%20ervices/our%20insights/blockchain%20in%20insurance%20opportunity%20or%20threat/blockchain-in-insurance-opportunity-or-threat.ashx>, 9 pages, 2016.

\* cited by examiner

BLOCKCHAIN-BASED SERVICE EXECUTION METHOD AND APPARATUS, AND ELECTRONIC DEVICE

CROSS-REFERENCE TO RELATED APPLICATIONS

This application is a continuation of U.S. patent application Ser. No. 16/370,317, filed on Mar. 29, 2019, which claims priority to Chinese Patent Application No. 201810277604.9, filed on Mar. 30, 2018, each of which is hereby incorporated by reference in its entirety.

TECHNICAL FIELD

One or more implementations of the present specification relate to the field of blockchain technologies, and in particular, to a blockchain-based service execution method and apparatus, and an electronic device.

BACKGROUND

Blockchain technology, also referred to as a distributed ledger technology, is a new technology in which one or more computing devices jointly participate in "accounting" and jointly maintain a complete distributed database. The blockchain technology has features of decentralization, openness, and transparency, each computing device can participate in database recording, and computing devices can rapidly perform data synchronization. Methods for establishing a decentralized system by using the blockchain technology and recording various execution programs for automatic execution in a distributed database of the blockchain have been widely applied to many fields.

SUMMARY

The present specification provides a blockchain-based service execution method, and the method includes: collecting appearance data of a target entity, and registering, in a distributed database of a blockchain, the appearance data as an identity of the target entity; receiving a target transaction initiated by a member node device in the blockchain, where the target transaction includes the appearance data of the target entity that is collected by the member node device and a service event that is related to the target entity and that is detected by the member node device; and invoking a smart contract that corresponds to the service event, and executing, based on the identity indicated by the appearance data of the target entity, service logic stated in the smart contract.

Optionally, an optical medium for solidifying the appearance data of the target entity is sprayed on an outer surface of the target entity; and the collecting appearance data of a target entity includes: collecting, by using a mounted optical sensor, the appearance data of the target entity that is solidified by a nano-optical film.

Optionally, the optical medium is the nano-optical film.

Optionally, the registering, in a distributed database of a blockchain, the appearance data as an identity of the target entity includes: storing the appearance data in the distributed database of the blockchain to form an association with the identity of the target entity that is registered in the blockchain.

Optionally, the method further includes: when the collected appearance data of the target entity changes, updating, based on changed appearance data, the appearance data that is registered in the distributed database of the blockchain, generating a corresponding update record, and storing the update record in the distributed database of the blockchain.

Optionally, the target entity includes a vehicle, and the member node device includes a public transport device that accesses the blockchain.

Optionally, the service event includes a vehicle violation event, and the service logic stated in the smart contract includes violation processing logic that corresponds to the vehicle violation event.

Optionally, the service event includes a vehicle accident event, and the service logic stated in the smart contract includes vehicle accident liability determining logic and vehicle accident settlement logic that correspond to the vehicle accident event.

Optionally, the service event includes a traffic congestion event, and the service logic stated in the smart contract includes right-of-way yielding logic that corresponds to the traffic congestion event.

Optionally, the service event includes a driving event of entering a planned road section by a vehicle, and the service logic stated in the smart contract includes reward logic that corresponds to the driving event of entering a planned road section by a vehicle.

Optionally, the service event includes a driving event of entering a planned road section by a vehicle, and the service logic stated in the smart contract includes service logic that corresponds to the driving event of entering a planned road section by a vehicle.

Optionally, the blockchain is a consortium blockchain.

The present specification further provides a blockchain-based service execution apparatus, and the apparatus includes: a registration module, configured to collect appearance data of a target entity, and register, in a distributed database of a blockchain, the appearance data as an identity of the target entity; a receiving module, configured to receive a target transaction initiated by a member node device in the blockchain, where the target transaction includes the appearance data of the target entity that is collected by the member node device and a service event that is related to the target entity and that is detected by the member node device; and an execution module, configured to invoke a smart contract that corresponds to the service event, and execute, based on the identity indicated by the appearance data of the target entity, service logic stated in the smart contract.

Optionally, an optical medium for solidifying the appearance data of the target entity is sprayed on an outer surface of the target entity; and the registration module is configured to: collect, by using a mounted optical sensor, the appearance data of the target entity that is solidified by the optical medium.

Optionally, the optical medium is a nano-optical film.

Optionally, the registration module is configured to: store the appearance data in the distributed database of the blockchain to form an association with the identity of the target entity that is registered in the blockchain.

Optionally, the apparatus further includes: an update module, configured to: when the collected appearance data of the target entity changes, update, based on changed appearance data, the appearance data that is registered in the distributed database of the blockchain, generate a corresponding update record, and store the update record in the distributed database of the blockchain.

Optionally, the target entity includes a vehicle, and the member node device includes a public transport device that accesses the blockchain.

Optionally, the service event includes a vehicle violation event, and the service logic stated in the smart contract includes violation processing logic that corresponds to the vehicle violation event.

Optionally, the service event includes a vehicle accident event, and the service logic stated in the smart contract includes vehicle accident liability determining logic and vehicle accident settlement logic that correspond to the vehicle accident event.

Optionally, the service event includes a traffic congestion event, and the service logic stated in the smart contract includes right-of-way yielding logic that corresponds to the traffic congestion event.

Optionally, the service event includes a driving event of entering a planned road section by a vehicle, and the service logic stated in the smart contract includes reward logic that corresponds to the driving event of entering a planned road section by a vehicle.

Optionally, the service event includes a driving event of entering a planned road section by a vehicle, and the service logic stated in the smart contract includes service logic that corresponds to the driving event of entering a planned road section by a vehicle.

Optionally, the blockchain is a consortium blockchain.

The present specification further provides an electronic device, and the electronic device includes: a processor; and a memory, configured to store a machine-executable instruction; where by reading and executing a machine-executable instruction that is stored in the memory and that corresponds to blockchain-based service execution control logic, the processor is enabled to: collect appearance data of a target entity, and register, in a distributed database of a blockchain, the appearance data as an identity of the target entity; receive a target transaction initiated by a member node device in the blockchain, where the target transaction includes the appearance data of the target entity that is collected by the member node device and a service event that is related to the target entity and that is detected by the member node device; and invoke a smart contract that corresponds to the service event, and execute, based on the identity indicated by the appearance data of the target entity, service logic stated in the smart contract.

DESCRIPTION OF IMPLEMENTATIONS

Figure 1:
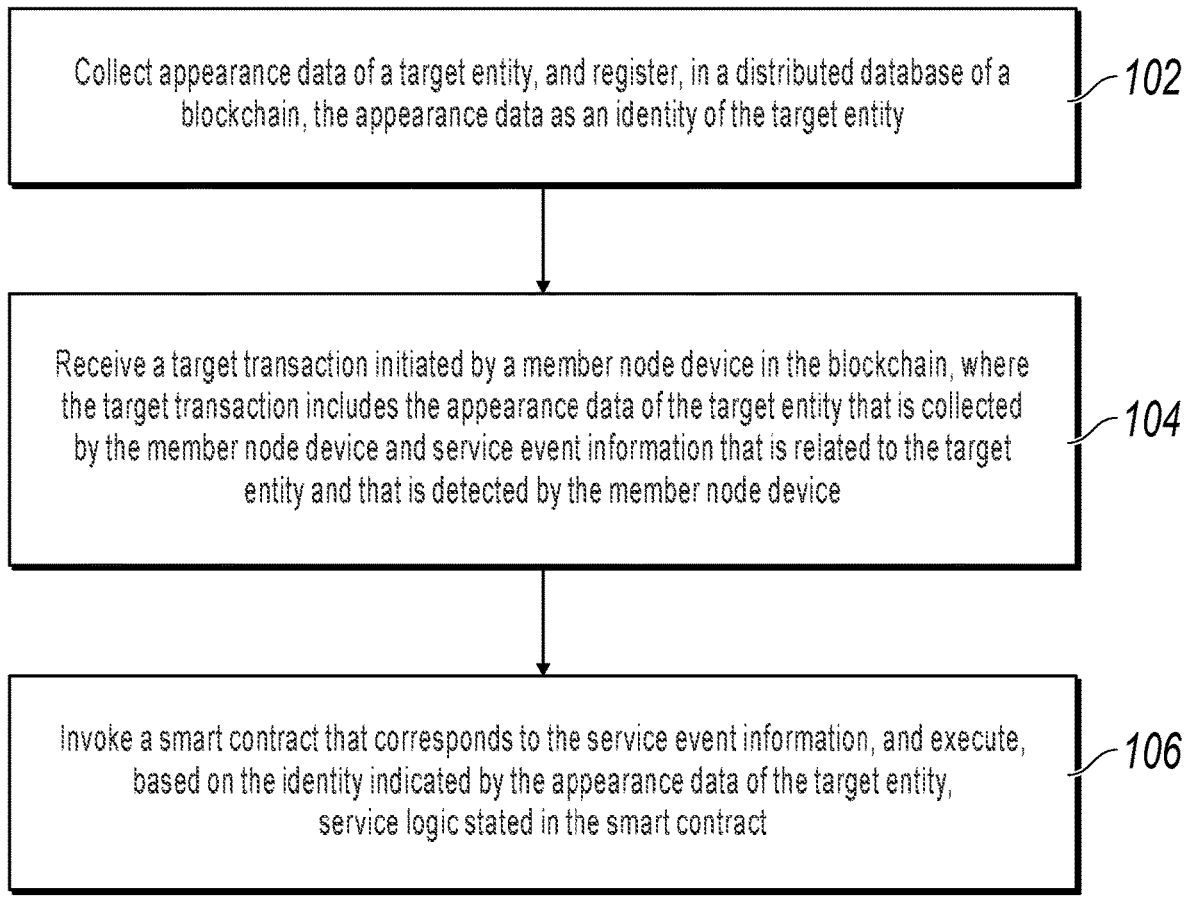
FIG. 1 is a flowchart illustrating a blockchain-based service execution method, according to an example implementation.

The present specification provides a technical solution for registering, in a blockchain, appearance data of a target entity in the real world as an identity of the target entity, and triggering, in the blockchain based on the identity indicated by the appearance data of the target entity, execution of service interaction related to the identity of the target entity.

During implementation, when an operator of the blockchain needs to deploy, in the blockchain, a service related to the identity of the target entity, the operator of the blockchain can predefine a service event related to the target entity, deploy, in the blockchain, a smart contract that corresponds to the service event, and state, in the smart contract, service logic that corresponds to the service event and whose execution needs to be triggered based on the identity of the target entity.

In addition, a node device in the blockchain that is interconnected with the target entity can collect the appearance data of the target entity, and register, in a distributed database of the blockchain, the appearance data as the identity of the target entity.

In addition, after detecting the service event related to the target entity, a member node device (including the previous node device) in the blockchain can create a target transaction and publish the target transaction in the blockchain based on the collected appearance data and the detected service event, initiate contract invocation of the smart contract, and then execute, based on the identity indicated by the appearance data of the target entity, the service logic stated in the smart contract.

On the one hand, because the appearance data of the target entity is easy to collect, the appearance data of the target entity is registered in the distributed database of the blockchain as the identity of the target entity, so that after detecting the service event that corresponds to the target entity, the member node device in the blockchain can rapidly identify, by further collecting the appearance data of the target entity, the target entity that corresponds to the service event, to easily associate the service event with the identity of the target entity.

On the other hand, because the appearance data of the target entity is registered in the distributed database of the blockchain as the identity of the target entity, when creating the transaction based on the appearance data of the target entity and the service event and invoking the smart contract that is published in the blockchain and that corresponds to the service event, the member node device in the blockchain can execute, by using the identity indicated by the appearance data of the target entity, the service logic stated in the smart contract, to easily complete, in the blockchain, service interaction related to the identity of the target entity, thereby improving flexibility and extensibility of the blockchain from a service perspective.

The following describes the present specification by using specific implementations with reference to specific application scenarios.

FIG. 1 illustrates a blockchain-based service execution method, according to an implementation of the present specification. The method is applied to any node device in a blockchain, to perform the following steps:

Step 102: Collect appearance data of a target entity, and register, in a distributed database of a blockchain, the appearance data as an identity of the target entity.

Step 104: Receive a target transaction initiated by a member node device in the blockchain, where the target transaction includes the appearance data of the target entity that is collected by the member node device and a service event that is related to the target entity and that is detected by the member node device.

Step 106: Invoke a smart contract that corresponds to the service event, and execute, based on the identity indicated by the appearance data of the target entity, service logic stated in the smart contract.

The target entity can include any type of entity in the real world that can access the blockchain as a member.

For example, the target entity can include an entity such as a vehicle, a public transport device (for example, a traffic camera, traffic lights, or a smart zebra crosswalk), merchandise, or the like. In actual applications, these entities can be transformed into smart devices by disposing a chip, a sensor, or another form of smart hardware inside these entities, and access the blockchain as member devices.

Correspondingly, the blockchain described in the present specification can include any type of blockchain network that allows the target entity in the real world to access as a member.

For example, in a scenario, the target entity can be a vehicle, and the blockchain can be a consortium blockchain formed by member devices such as an operator service, a service server, one or more vehicles, and public transport devices such as a traffic camera, traffic lights, and a smart zebra crosswalk. An operator of the consortium blockchain can deploy, based on the consortium blockchain, online service interaction related to an identity of the vehicle, such as blockchain-based vehicle accident liability determining and vehicle accident settlement.

The service event may include any type of online service that is related to the identity of the target entity and that needs to be deployed and implemented by the operator of the blockchain in the blockchain.

Correspondingly, the service logic stated in the smart contract that corresponds to the service event may include any form of the described service logic whose execution needs to be triggered based on the identity of the target entity.

For example, in a scenario, the target entity is still a vehicle, the blockchain is a consortium blockchain formed by public transport devices that serve as member devices, for example, one or more vehicles, a traffic camera, traffic lights, and a smart zebra crosswalk, and the service event can include a "vehicle violation event", a "vehicle accident event", or a "traffic congestion event" that is related to the vehicle serving as a member device. In addition, service logic that corresponds to the service events and that is stated in the smart contract can include "violation processing logic that corresponds to the vehicle violation event", "vehicle accident determining logic and vehicle accident settlement logic that corresponds to the vehicle accident event", and "right-of-way yielding logic that corresponds to the traffic congestion event".

The following describes in detail the technical solutions of the present specification by using an example in which the target entity is a vehicle and the blockchain is a consortium blockchain.

When the operator of the consortium blockchain needs to deploy, in the consortium blockchain and based on a specific architecture of the consortium blockchain, an online service whose execution needs to be triggered based on a real identity of the vehicle, the operator of the consortium blockchain can first predefine a service event related to the vehicle, develop a corresponding smart contract based on the described service event, and state, in the smart contract, service logic that corresponds to the service event and whose execution needs to be triggered.

For example, during implementation, the service event described by the operator can be used as an execution condition of the smart contract, and the smart contract can state program code (for example, some program methods or functions) that is related to the service logic and whose execution needs to be triggered when the execution condition of the smart contract is satisfied.

A specific type of the service event described by the operator and the service logic that corresponds to the service event usually both depend on an actual service need of the operator. Implementations are not limited in the present specification.

For a developed smart contract, the operator can publish the smart contract in the consortium blockchain by using any node device in the consortium blockchain, and the smart contract is recorded in the distributed database (namely, a distributed ledger) of the consortium blockchain after some designated member node devices (for example, one or more designated authoritative node devices in the consortium blockchain that have accounting privilege) in the consortium blockchain reach a consensus on the smart contract. Subsequently, a user can submit a transaction to the smart contract recorded in the blockchain by accessing client software of any node device, to initiate contract invocation of the smart contract and trigger execution of related service logic in the consortium blockchain.

It is worthwhile to note that, a consensus algorithm used when the member node device in the consortium blockchain performs consensus processing on the smart contract published in the blockchain and a specific consensus process are omitted in the present specification. A person skilled in the art can refer to records of related technologies when implementing the technical solutions recorded in the present specification.

In the present specification, the vehicle can be transformed into a smart transport device by embedding a chip, a sensor, or another form of smart hardware in the vehicle, and access the blockchain as a member device.

In a shown implementation, generation hardware (for example, a USB key) of a private key and a public key can be embedded in the vehicle, or a key algorithm used to generate a private key and a public key is added to a storage device of the vehicle. When accessing the consortium blockchain as a member device, the vehicle can first create a pair of a private key and a public key by using the mounted generation hardware of the private key and the public key or by invoking the included key algorithm.

Then, a transaction used to initiate registration can be further created, and after the transaction is signed based on the generated private key, the transaction is published in the consortium blockchain to apply to join the consortium blockchain. After receiving the transaction, some designated member node devices in the consortium blockchain can verify a signature of the transaction based on a public key that corresponds to the private key used when the transaction is signed, and can perform consensus processing on the transaction after the signature verification succeeds.

When a consensus on the transaction is reached, the public key of the vehicle can be calculated, and an account address is created for the vehicle in the consortium blockchain. In this case, the vehicle successfully joins the consortium blockchain as a member node device, and the account address generated for the vehicle is an identity of the member node device in the consortium blockchain.

In actual applications, because the account address created by the consortium blockchain for the vehicle after the vehicle joins the consortium blockchain is usually the identity of the vehicle in the consortium blockchain, if the operator of the consortium blockchain needs to perform, in the consortium blockchain, online deployment of some offline services whose execution needs to be triggered based on the real identity of the vehicle, the identity of the vehicle in the consortium blockchain cannot be easily associated with the deployed offline services.

For example, the offline services are an online vehicle accident liability determining service and an online vehicle accident settlement service that are to be completed in the consortium blockchain based on a detected vehicle violation event. After a member node device in the consortium blockchain detects that the vehicle commits a violation, because the member node device cannot learn of a real identity of the violating vehicle in the consortium blockchain, the member node device cannot associate the detected vehicle violation event with the real identity of the vehicle in the consortium blockchain, and cannot complete online service interaction, such as vehicle accident liability determining and vehicle accident settlement, based on the smart contract published in the consortium blockchain.

In the present specification, appearance data of the vehicle can be registered in a distributed database of the consortium blockchain as identity information of the vehicle in the consortium blockchain.

In a shown implementation, as a member node device, the vehicle can collect the appearance data of the vehicle by using a built-in chip, a built-in sensor, or another form of built-in intelligent hardware, and then store the collected appearance data in the distributed database of the consortium blockchain to form an association with the account address of the vehicle in the consortium blockchain, to register the appearance data of the vehicle as the identity information of the vehicle in addition to the owned identity of the vehicle in the consortium blockchain.

Certainly, if the vehicle does not have an account address as an identity in the consortium blockchain, the appearance data of the vehicle can be directly used as the identity of the vehicle in the consortium blockchain. For example, the appearance data of the vehicle serves as the public key of the vehicle, and the appearance data of the vehicle is calculated, to create an account address for the vehicle as the identity in the blockchain.

In a shown implementation, an optical medium for solidifying the appearance data of the vehicle can be pre-sprayed on an outer surface of the vehicle.

A specific material of the optical medium is not limited in the present specification, and includes, but is not limited to, any material that can be sprayed on the outer surface of the vehicle to solidify the appearance data of the vehicle.

For example, in an implementation, the optical medium can be a nano-optical film. The nano-optical film can be made of a nanoscale carbon-structured material. After being sprayed on the outer surface of the vehicle, the nanoscale carbon-structured material can wrap the entire vehicle to form a circuit, and the formed layer of nano-optical film can automatically solidify a shape of the vehicle.

In addition, the vehicle can be mounted with an optical sensor configured to collect the appearance data of the vehicle that is solidified by the nano-optical film, and optical sensing is performed on the nano-optical film by using the optical sensor, to collect the appearance data of the vehicle that is solidified by the nano-optical film.

Certainly, in addition to the previously shown implementation of solidifying and collecting the appearance data of the vehicle by spraying the optical medium on the vehicle, in actual applications, other methods may be used to collect the appearance data of the vehicle, which are not listed one by one in the present specification.

For example, three-dimensional scanning can be performed on the entire vehicle to precisely collect the appearance data of the vehicle; or an image of the vehicle is collected by using a visual technology, and the appearance data of the vehicle is generated through calculation based on the collected image.

In another shown implementation, when the collected appearance data of the vehicle changes, for example, when a vehicle accident occurs or another event that can change the shape of the vehicle happens, the appearance data registered in the distributed database of the consortium blockchain can be further updated based on the changed appearance data.

Further, during each update of the appearance data of the vehicle that is registered in the distributed database of the consortium blockchain, a corresponding update record can be further generated. For example, a transaction that includes the appearance data prior to the change and the changed appearance data is generated and published in the distributed database of the blockchain, and after a consensus on the transaction is reached, the transaction is recorded in the distributed database of the consortium blockchain.

In this method, in some service scenarios in which historical changes of the appearance data of the vehicle need to be invoked (for example, the historical changes of the appearance data of the vehicle are invoked to determine or evaluate damage of the vehicle), change data of the appearance data of the vehicle can be retrieved from the distributed database of the blockchain.

In the present specification, after the appearance data of the vehicle is registered in the distributed database of the consortium blockchain as the identity of the vehicle, if any member node device in the consortium blockchain detects a service event related to the vehicle, the member node device can publish the detected service event in the consortium blockchain in a form of transaction, and member node devices in the consortium blockchain that detect the service event perform consensus processing on the service event.

In the present specification, in the consortium blockchain, the consensus processing on the detected service event related to the vehicle is a process in which the node devices broadcast the detected service event by using the consortium blockchain, and make a joint decision on the service event based on "evidence" from the plurality of parties.

For example, the service event is a vehicle violation event, and the member node devices in the consortium blockchain include, for example, one or more vehicles, a traffic camera, traffic lights, and a smart zebra crosswalk. After a certain traffic camera serving as a member node device in the consortium blockchain detects that a certain vehicle commits a violation, the traffic camera can broadcast, in a form of transaction, the detected vehicle violation event to surrounding node devices in the consortium blockchain, and perform consensus processing on the transaction together with other surrounding member node devices that can also detect the violation event of the vehicle, such as other vehicles, a traffic light, and a smart zebra crosswalk. After a consensus is reached, it indicates that other surrounding node devices of the traffic camera can also detect that the vehicle commits a violation, the violation event of the vehicle that is detected by the traffic camera is reliable, and the plurality of parties jointly determine that the vehicle actually commits a violation.

In the present specification, after the consensus is reached on the service event detected by the member node device, the member node device can further collect the appearance data of the vehicle to determine the identity of the vehicle that corresponds to the service event.

For example, if the service event is a vehicle violation event, after detecting that the vehicle commits a violation, the member node device in the consortium blockchain can further sense, by using a mounted optical sensor, a nano-optical film sprayed on an outer surface of the vehicle, to collect appearance data of the vehicle that is solidified by the nano-optical film, thereby determining the identity of the currently violating vehicle in the consortium blockchain.

Further, the member node device in the consortium blockchain can create a transaction based on the detected service event and the collected appearance data of the vehicle, to initiate contract invocation of the smart contract that corresponds to the service event and that is deployed in the consortium blockchain, and trigger, in the consortium blockchain based on the real identity indicated by the appearance data of the vehicle, execution of service logic that corresponds to the service event and that is stated in the smart contract, thereby completing corresponding service interaction in the consortium blockchain.

For example, during implementation, the created transaction can include an account address of the smart contract, and then the transaction can be submitted to the smart contract as input of the smart contract based on the account address, to initiate invocation of the smart contract and trigger execution of program code that is stated in the smart contract and that is related to the service logic corresponding to the service event.

It is worthwhile to note that, when the member node device in the consortium blockchain creates a transaction for initiating invocation of the smart contract, the member node device can automatically create the transaction based on the detected service event and the collected appearance data of the vehicle, or the user can trigger creation of the transaction.

For example, if the user triggers creation of the transaction to initiate invocation of the smart contract, the vehicle can be mounted with voice interaction hardware, and a driver can trigger, by initiating a voice instruction to the vehicle, automatic creation of the transaction on the vehicle, to initiate invocation of the smart contract. If the service event is a traffic congestion event and the service logic stated in the smart contract is right-of-way yielding logic that corresponds to the traffic congestion event, the voice instruction can be a voice instruction "initiating a right-of-way yielding contract".

Further, when invocation of the smart contract is completed, the member node device can also broadcast a prompt message to one or more surrounding node devices. After receiving the prompt message, the vehicle can play the prompt message for the driver in a voice or another form. If the service event is a vehicle violation event and the service logic stated in the smart contract is violation processing logic that corresponds to the vehicle violation event, the prompt message can be a prompt message "Driver of the vehicle with license plate No. XX committed a violation, and the smart contract has already helped you pay the fine".

The following describes in detail the described technical solutions with reference to specific service scenarios.

In a shown implementation, the member node devices that form the consortium blockchain can include a server of the operator of the consortium blockchain, one or more third-party service servers, one or more vehicles, a traffic camera, traffic lights, a smart zebra crosswalk, etc.

The service server can be a server deployed by the operator based on an actual service need, or can be a third-party service server interconnected with the operator. If an online vehicle accident liability determining service and an online vehicle accident settlement service are to be completed in the consortium blockchain, the service server can be a service server of a third-party traffic management bureau or insurance company that is interconnected with the operator.

(1) Service Scenario 1

In a service scenario, an online service whose execution needs to be triggered based on the real identity of the vehicle and that is deployed in the consortium blockchain by the operator of the consortium blockchain can be an online violation processing service that is to be completed in the consortium blockchain based on a detected vehicle violation event.

In this scenario, the service event can be a "vehicle violation event" related to the vehicle. Correspondingly, service logic that corresponds to the service event and that is stated in the smart contract can be "violation processing logic that corresponds to the vehicle violation event".

For example, the violation processing logic can be logic of taking punitive measures such as a fine and a penalty point based on a specific violation type of the vehicle.

Assume that the smart zebra crosswalk serving as a member node device detects that a vehicle commits a violation event "illegal parking on the zebra crosswalk". The smart zebra crosswalk can broadcast, in the consortium blockchain, the violation event to surrounding member node devices of the smart zebra crosswalk, for example, other vehicles, the traffic camera, and the traffic lights, to perform consensus processing.

After a consensus is reached, the member node device can create a transaction based on the violation event and the collected appearance data of the vehicle, to initiate contract invocation of the smart contract (such as, a violation processing contract) that corresponds to the violation event and that is deployed in the consortium blockchain, and execute, in the consortium blockchain, the violation processing logic that corresponds to the violation event and that is stated in the smart contract, thereby completing punitive operations such as a fine and a penalty point in a stored account address associated with the appearance data of the vehicle.

After invocation of the smart contract is completed, the smart zebra crosswalk serving as a member node device can broadcast a prompt message "Driver of the vehicle with license plate No. XX committed a violation, and the smart contract has already helped you pay the fine" to the surrounding node devices, and the prompt message is played for the user by using the vehicle.

(2) Service Scenario 2

In another service scenario, online services whose execution needs to be triggered based on the real identity of the vehicle and that are deployed in the consortium blockchain by the operator of the consortium blockchain can be an online vehicle accident liability determining service and an online vehicle accident settlement service that are to be completed in the consortium blockchain based on a detected vehicle violation event.

In this scenario, the service event can be a "vehicle accident event" related to the vehicle. Correspondingly, service logic that corresponds to the service event and that is stated in the smart contract can be "vehicle accident liability determining logic and vehicle accident settlement logic that correspond to the vehicle accident event".

For example, the vehicle accident liability determining logic and the vehicle accident settlement logic can be logic of determining vehicle accident liability and logic of executing settlement.

Assume that the vehicle serving as a member node device detects that a "rear-end collision" accident happens to the vehicle. The vehicle can broadcast, in the consortium blockchain, the vehicle accident event to surrounding member node devices of the vehicle, for example, another vehicle, the smart zebra crosswalk, the traffic camera, and the traffic lights, to perform consensus processing.

After a consensus is reached, the member node device can create a transaction based on the vehicle accident event and the collected appearance data of the vehicle, to initiate contract invocation of the smart contract (such as, a vehicle accident liability determining contract) that corresponds to the vehicle accident event and that is deployed in the consortium blockchain, and execute, in the consortium blockchain, the vehicle accident liability determining logic and the vehicle accident settlement logic that correspond to the vehicle accident event and that are stated in the smart contract, thereby completing an operation of determining vehicle accident liability and an operation of executing corresponding vehicle accident settlement.

After invocation of the smart contract is completed, the vehicle serving as a member node device can play a prompt message "Full liability is confirmed, and the insurance company has been informed of settlement payment" for the driver. Alternatively, in another implementation, the prompt message can be a prompt message "Full liability is confirmed, and the insurance company has been informed. Please determine whether to pay settlement", and the driver can confirm payment in a form of a voice instruction.

(3) Service Scenario 3

In another service scenario, an online service whose execution needs to be triggered based on the real identity of the vehicle and that is deployed in the consortium blockchain by the operator of the consortium blockchain can be an online right-of-way yielding service that is to be completed in the consortium blockchain based on a detected traffic congestion event.

For example, after encountering vehicle congestion, a vehicle driver can actively yield right-of-way of the vehicle to a surrounding vehicle, to obtain a pass priority.

In this scenario, the service event can be a "traffic congestion event" related to the vehicle. Correspondingly, service logic that corresponds to the service event and that is stated in the smart contract can be "right-of-way yielding logic that corresponds to the traffic congestion event".

In an example, the right-of-way yielding logic can be processing logic that a vehicle automatically obtains X minutes of right of way after the vehicle actively gives the way to a vehicle that initiates right-of-way yielding. Alternatively, the right-of-way yielding logic can be processing logic that a vehicle automatically obtains X minutes of right of way after the vehicle actively gives the way to a public transportation vehicle (for example, a bus).

In an implementation, assume that the vehicle serving as a member node device detects that a congestion event happens to the vehicle. The vehicle can broadcast, in the consortium blockchain, the vehicle accident event to surrounding member node devices of the vehicle, for example, another vehicle, the smart zebra crosswalk, the traffic camera, and the traffic lights, to perform consensus processing.

After a consensus is reached, the member node device can create a transaction based on the congestion event and the collected appearance data of the vehicle, to initiate contract invocation of the smart contract (such as, a right-of-way yielding contract) that corresponds to the vehicle accident event and that is deployed in the consortium blockchain, and execute, in the consortium blockchain, the right-of-way yielding logic that corresponds to the vehicle accident event and that is stated in the smart contract. After detecting that surrounding vehicles actively give the way, the member node device automatically grants a certain amount of right-of-way time to the vehicles that actively give the way, and broadcasts a prompt message "X minutes of right of way are obtained" to these vehicles that actively give the way.

In another implementation, invocation of the smart contract shown above can also be manually triggered by a vehicle driver. After the driver encounters congestion, the driver can perform voice interaction with the vehicle by sending a voice instruction "initiate the right-of-way yielding contract", and the vehicle broadcasts a prompt message "A following vehicle has an emergent pass need, and requests to use a right lane with a contract reward of X minutes of right of way" to other surrounding vehicles. After detecting that surrounding vehicles actively give the way, the vehicle automatically grants a certain amount of right-of-way time to the vehicles that actively give the way, and broadcasts a prompt message "X minutes of right of way are obtained" to these vehicles that actively give the way.

After invocation of the smart contract is completed, the vehicle serving as a member node device can play a prompt message "A driver who gave the way has already obtained X minutes of right of way" for the driver.

(4) Service Scenario 4

In another service scenario, an online service whose execution needs to be triggered based on the real identity of the vehicle and that is deployed in the consortium blockchain by the operator of the consortium blockchain can be an online reward service that is to be completed in the consortium blockchain based on a detected driving event of entering a planned road section by a vehicle.

The planned road section can be a preferred driving road section that is stated in a smart contract and that is planned by the operator of the consortium blockchain or a third party (for example, a traffic management bureau) interconnected with the consortium blockchain, for example, a congestion dispersion road section actively planned by the traffic management bureau in case of congestion.

In this scenario, the service event can be the "driving event of entering a planned road section" that is related to the vehicle. Correspondingly, service logic that corresponds to the service event and that is stated in the smart contract can be "reward logic that corresponds to the driving event of entering a planned road section by a vehicle".

For example, the reward logic can be processing logic that a certain number of rewards are granted to the driver after the vehicle actively enters the preferred driving road section. For example, a certain number of points or certain duration of right of way can be automatically delivered to an account of the driver as a reward.

In an implementation, assume that a traffic camera serving as a member node device detects the driving event of entering a preferred driving road section by a vehicle. The traffic camera can broadcast, in the consortium blockchain, the driving event to surrounding member node devices of the traffic camera, such as vehicles, the smart zebra crosswalk, and the traffic lights, to perform consensus processing.

After a consensus is reached, the traffic camera can create a transaction based on the driving event and the collected appearance data of the vehicle, to initiate contract invocation of the smart contract (such as, a traffic guide contract) that corresponds to the driving event and that is deployed in the consortium blockchain, and execute, in the consortium blockchain, the reward logic that corresponds to the driving event and that is stated in the smart contract. After detecting that vehicles actively enter the planned road section, the traffic camera automatically grants a certain number of rewards to drivers of these vehicles, and broadcasts a prompt message "A reward of XXX is obtained" to these vehicles.

In another implementation, invocation of the smart contract shown above can also be manually triggered by a vehicle driver. When the driver encounters congestion and a latest planned road section is broadcast in the consortium blockchain, the driver can perform voice interaction with the vehicle by sending a voice instruction "initiate the traffic guide contract", and then actively drive to the planned road section to obtain the reward. After detecting a driving event of actively entering a preferred driving road section by a vehicle, the traffic camera can automatically grant a certain number of rewards to the driver, and broadcast a prompt message "You have entered the planned road section and obtained a reward of XXX" to the vehicle.

(5) Service Scenario 5

In another service scenario, an online service whose execution needs to be triggered based on the real identity of the vehicle and that is deployed in the consortium blockchain by the operator of the consortium blockchain can be corresponding service logic that is to be completed in the consortium blockchain based on a detected driving event of entering a planned road section by a vehicle.

In this scenario, the planned road section can be a restricted road section that is stated in a smart contract and that is planned by the operator of the consortium blockchain or a third party (for example, a traffic management bureau) interconnected with the consortium blockchain, for example, a congested road section or a restricted road section.

In this scenario, the service event can be the "driving event of entering a planned road section" that is related to the vehicle. Correspondingly, service logic that corresponds to the service event and that is stated in the smart contract can be "service logic that corresponds to the driving event of entering a planned road section by a vehicle".

For example, the service logic can be processing logic that the driver is charged a certain number of fees or a certain percentage of normal fees as additional fees besides the normal fees after the vehicle actively enters the restricted road section.

In an implementation, assume that a traffic camera serving as a member node device detects a driving event of entering a restricted road section by a vehicle. The traffic camera can broadcast, in the consortium blockchain, the driving event to surrounding member node devices of the traffic camera, such as vehicles, the smart zebra crosswalk, and the traffic lights, to perform consensus processing.

After a consensus is reached, the traffic camera can create a transaction based on the driving event and the collected appearance data of the vehicle, to initiate contract invocation of the smart contract (such as, a traffic guide contract) that corresponds to the driving event and that is deployed in the consortium blockchain, and execute, in the consortium blockchain, the service logic that corresponds to the driving event and that is stated in the smart contract. After detecting that vehicles actively enter the restricted road section, the traffic camera automatically charges drivers of these vehicles a certain number of fees or a certain percentage of additional fees besides the normal fees, and broadcasts a prompt message "You have entered a restricted road section and already been charged fees of XXX" to these vehicles.

In the previous implementations, examples in which the target entities are vehicles are used to describe in detail the technical solutions of the present specification. It is worthwhile to further note that, in actual applications, the target entities can be other types of entities that can access the blockchain as members, which are not listed one by one in the present specification.

It can be seen from the previous implementations that, on the one hand, because the appearance data of the target entity is easy to collect, the appearance data of the target entity is registered in the distributed database of the blockchain as the identity of the target entity, so that after detecting the service event that corresponds to the target entity, the member node device in the blockchain can rapidly identify, by further collecting the appearance data of the target entity, the target entity that corresponds to the service event, to easily associate the service event with the identity of the target entity.

On the other hand, because the appearance data of the target entity is registered in the distributed database of the blockchain as the identity of the target entity, when creating the transaction based on the appearance data of the target entity and the service event and invoking the smart contract that is published in the blockchain and that corresponds to the service event, the member node device in the blockchain can execute, by using the identity indicated by the appearance data of the target entity, the service logic stated in the smart contract, to easily complete, in the blockchain, service interaction related to the identity of the target entity, thereby improving flexibility and extensibility of the blockchain from a service perspective.

Figure 2:
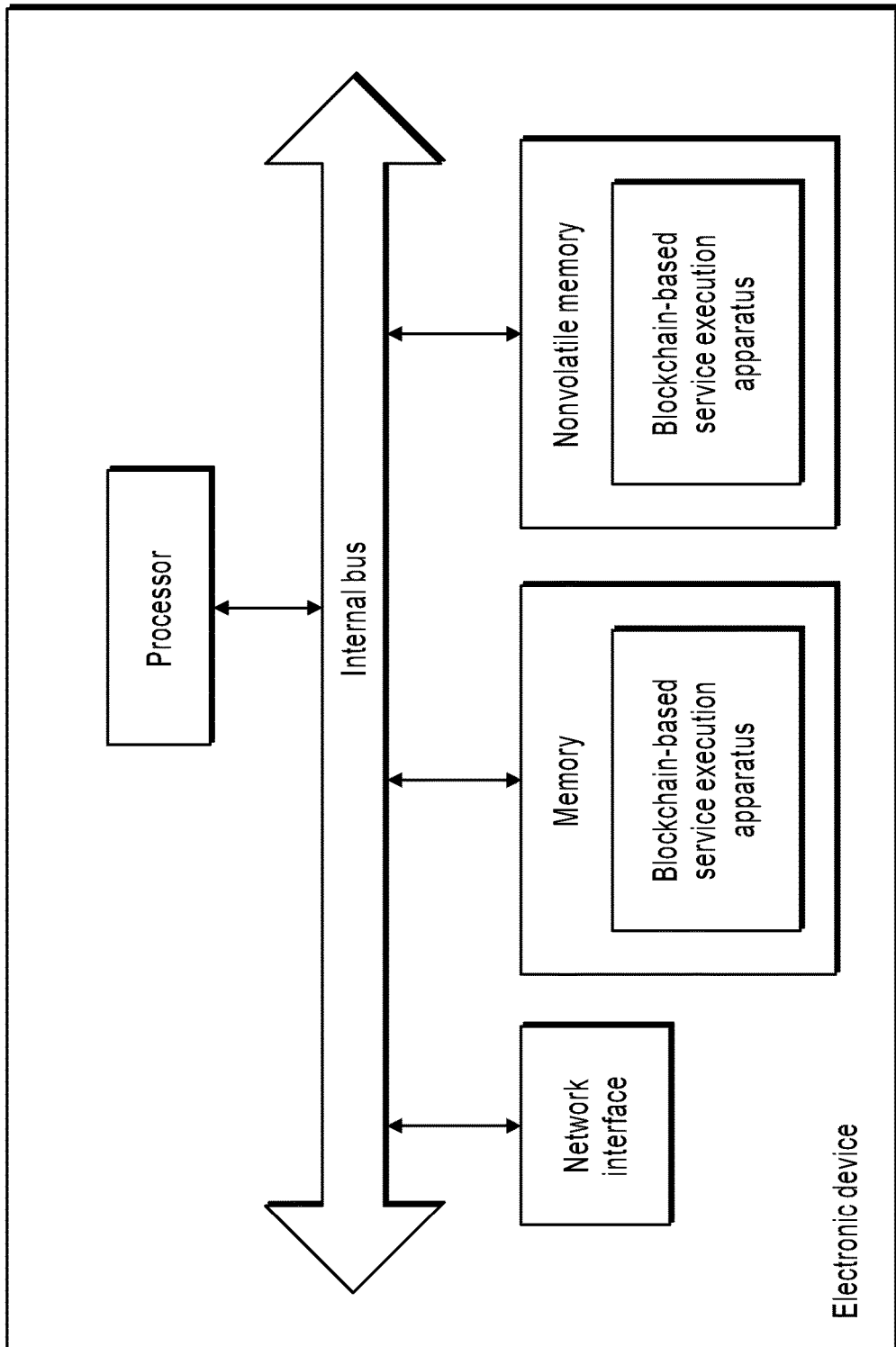
FIG. 2 is a schematic structural diagram illustrating an electronic device, according to an example implementation.

Corresponding to the previous method implementations, the present specification further provides an implementation of a blockchain-based service execution apparatus. The implementation of the blockchain-based service execution apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a nonvolatile memory to a memory by a processor of the electronic including the apparatus. In terms of hardware, FIG. 2 is a structural diagram illustrating hardware of an electronic device including the blockchain-based service execution apparatus, according to the present specification. In addition to a processor, a memory, a network interface, and a nonvolatile memory shown in FIG. 2, the electronic device including the apparatus in the implementation usually can further include other hardware based on an actual function of the electronic device. Details are omitted here for simplicity.

Figure 3:
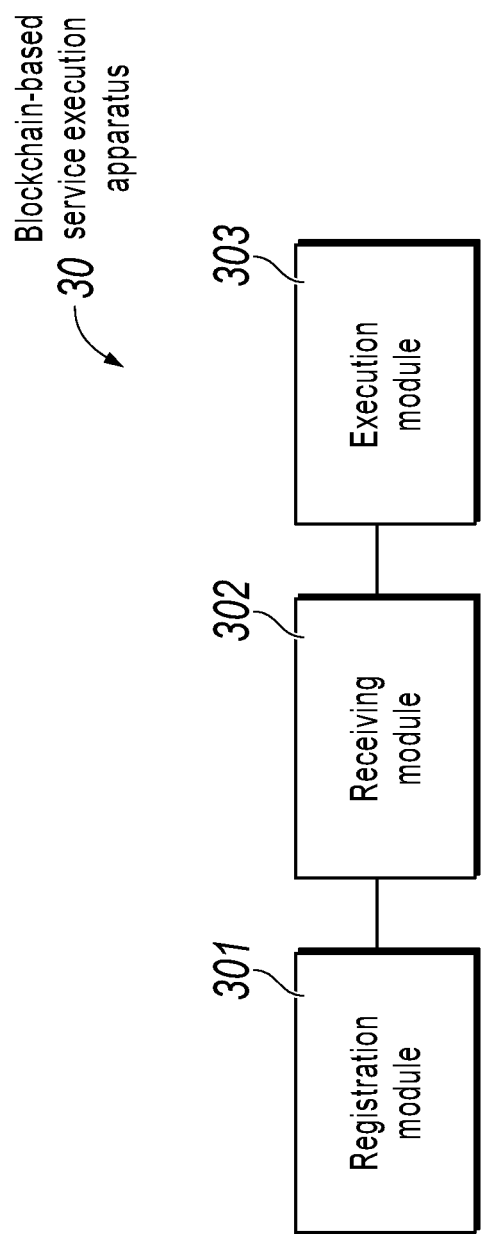
FIG. 3 is a block diagram illustrating a blockchain-based service execution apparatus, according to an example implementation.

FIG. 3 is a block diagram illustrating a blockchain-based service execution apparatus shown in an example implementation of the present specification.

Referring to FIG. 3, a blockchain-based service execution apparatus 30 can be applied to the electronic device shown in FIG. 2, and include a registration module 301, a receiving module 302, and an execution module 303.

The registration module 301 is configured to collect appearance data of a target entity, and register, in a distributed database of a blockchain, the appearance data as an identity of the target entity.

The receiving module 302 is configured to receive a target transaction initiated by a member node device in the blockchain, where the target transaction includes the appearance data of the target entity that is collected by the member node device and a service event that is related to the target entity and that is detected by the member node device.

The execution module 303 is configured to invoke a smart contract that corresponds to the service event, and execute, based on the identity indicated by the appearance data of the target entity, service logic stated in the smart contract.

In the present implementation, an optical medium for solidifying the appearance data of the target entity is sprayed on an outer surface of the target entity; and the registration module 301 is configured to: collect, by using a mounted optical sensor, the appearance data of the target entity that is solidified by the optical medium.

In the present implementation, the optical medium is a nano-optical film.

In the present implementation, the registration module 301 is configured to: store the appearance data in the distributed database of the blockchain to form an association with the identity of the target entity that is registered in the blockchain.

In the present implementation, the blockchain-based service execution apparatus 30 further includes: an update module 304 (not shown in FIG. 3), configured to: when the collected appearance data of the target entity changes, update, based on changed appearance data, the appearance data that is registered in the distributed database of the blockchain, generate a corresponding update record, and store the update record in the distributed database of the blockchain.

In the present implementation, the target entity includes a vehicle, and the member node device includes a public transport device that accesses the blockchain.

In the present implementation, the service event includes a vehicle violation event, and the service logic stated in the smart contract includes violation processing logic that corresponds to the vehicle violation event.

In the present implementation, the service event includes a vehicle accident event, and the service logic stated in the smart contract includes vehicle accident liability determining logic and vehicle accident settlement logic that correspond to the vehicle accident event.

In the present implementation, the service event includes a traffic congestion event, and the service logic stated in the smart contract includes right-of-way yielding logic that corresponds to the traffic congestion event.

In the present implementation, the service event includes a driving event of entering a planned road section by a vehicle, and the service logic stated in the smart contract includes reward logic that corresponds to the driving event of entering a planned road section by a vehicle.

In the present implementation, the service event includes a driving event of entering a planned road section by a vehicle, and the service logic stated in the smart contract includes service logic that corresponds to the driving event of entering a planned road section by a vehicle.

In the present implementation, the blockchain is a consortium blockchain.

For an implementation process of functions and roles of each module in the apparatus, references can be made to an implementation process of a corresponding step in the previous method. Details are omitted here for simplicity.

Because an apparatus implementation basically corresponds to a method implementation, for related parts, references can be made to related descriptions in the method implementation. The previously described apparatus implementation is merely an example. The modules described as separate parts may or may not be physically separate, and parts displayed as modules may or may not be physical modules, may be located in one position, or may be distributed on a plurality of network modules. Some or all of the modules may be selected based on actual needs to achieve the objectives of the solutions in the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the described method implementation, the present specification further provides an implementation of an electronic device. The electronic device includes a processor and a memory configured to store a machine-executable instruction, and the processor and the memory are usually connected to each other by using an internal bus. In another possible implementation, the device may further include an external interface, to communicate with another device or component.

In the present implementation, by reading and executing a machine-executable instruction that is stored in the memory and that corresponds to blockchain-based service execution control logic, the processor is enabled to: collect appearance data of a target entity, and register, in a distributed database of a blockchain, the appearance data as an identity of the target entity; receive a target transaction initiated by a member node device in the blockchain, where the target transaction includes the appearance data of the target entity that is collected by the member node device and a service event that is related to the target entity and that is detected by the member node device; and invoke a smart contract that corresponds to the service event, and execute, based on the identity indicated by the appearance data of the target entity, service logic stated in the smart contract.

In the present implementation, an optical medium for solidifying the appearance data of the target entity is sprayed on an outer surface of the target entity; and by reading and executing a machine-executable instruction that is stored in the memory and that corresponds to blockchain-based service execution control logic, the processor is enabled to: collect, by using a mounted optical sensor, the appearance data of the target entity that is solidified by the optical medium.

In the present implementation, by reading and executing a machine-executable instruction that is stored in the memory and that corresponds to blockchain-based service execution control logic, the processor is enabled to: store the appearance data in the distributed database of the blockchain to form an association with the identity of the target entity that is registered in the blockchain.

In the present implementation, by reading and executing a machine-executable instruction that is stored in the memory and that corresponds to blockchain-based service execution control logic, the processor is enabled to: when the collected appearance data of the target entity changes, update, based on changed appearance data, the appearance data that is registered in the distributed database of the blockchain, generate a corresponding update record, and store the update record in the distributed database of the blockchain.

A person skilled in the art can easily figure out another implementation of the present specification after thinking over the present specification and practicing the present disclosure here. The present specification is intended to cover any variations, uses, or adaptations of the present specification, and these variations, uses, or adaptations follow the general principles of the present specification and include common knowledge or conventional techniques that are not disclosed in the existing technology of the present specification. The specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The described descriptions are merely examples of implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for a blockchain-based service, comprising:
    collecting appearance data of a vehicle as collected appearance data, the vehicle capable of accessing, as a member, a blockchain;
    generating, by generation hardware of the vehicle, a private key;
    generating a digital signature of a transaction using the private key, wherein the transaction is used to initiate registration of the vehicle in the blockchain;
    verifying the digital signature using the collected appearance data as a public key;
    registering, in a distributed database associated with the blockchain, the appearance data as an identity of the vehicle;
    detecting, by a member node device in the blockchain, a vehicle violation event that is related to the vehicle;
    receiving a target transaction initiated by the member node device in the blockchain, wherein the target transaction comprises the appearance data of the vehicle that is collected by the member node device and vehicle violation event information that is related to the vehicle violation event;
    invoking a smart contract that corresponds to the vehicle violation event information; and
    executing, based on the identity indicated by the appearance data of the vehicle, violation processing logic stated in the smart contract.

2. The computer-implemented method of claim 1, further comprising:
    broadcasting, by the member node device, the target transaction to the blockchain; and
    participating, by the member node device, in consensus processing by the blockchain on the target transaction.

3. The computer-implemented method of claim 2, wherein the vehicle violation event is detected by a plurality of additional member node devices, and wherein the plurality of additional member node devices jointly determine that the vehicle commits a violation.

4. The computer-implemented method of claim 3, wherein at least one of the plurality of additional member node devices is a traffic camera.

5. The computer-implemented method of claim 1, wherein executing the violation processing logic stated in the smart contract comprises taking punitive measures based on a specific violation type committed by the vehicle.

6. The computer-implemented method of claim 5, wherein the punitive measures comprise at least one of:
    a fine; or
    a penalty point associated with the vehicle.

7. The computer-implemented method of claim 1, further comprising following execution of the smart contract, broadcasting a message to a driver of the vehicle indicating results of the execution of the smart contract.

8. A non-transitory, computer-readable medium storing one or more instruction executable by a computer system to perform operations comprising:
    collecting appearance data of a vehicle as collected appearance data, the vehicle capable of accessing, as a member, a blockchain;
    generating, by generation hardware of the vehicle, a private key;
    generating a digital signature of a transaction using the private key, wherein the transaction is used to initiate registration of the vehicle in the blockchain;
    verifying the digital signature using the collected appearance data as a public key;
    registering, in a distributed database associated with the blockchain, the appearance data as an identity of the vehicle;
    detecting, by a member node device in the blockchain, a vehicle violation event that is related to the vehicle;
    receiving a target transaction initiated by the member node device in the blockchain, wherein the target transaction comprises the appearance data of the vehicle that is collected by the member node device and vehicle violation event information that is related to the vehicle violation event;
    invoking a smart contract that corresponds to the vehicle violation event information; and
    executing, based on the identity indicated by the appearance data of the vehicle, violation processing logic stated in the smart contract.

9. The non-transitory, computer-readable medium of claim 8, the operations further comprising:
    broadcasting, by the member node device, the target transaction to the blockchain; and
    participating, by the member node device, in consensus processing by the blockchain on the target transaction.

10. The non-transitory, computer-readable medium of claim 9, wherein the vehicle violation event is detected by a plurality of additional member node devices, and wherein the plurality of additional member node devices jointly determine that the vehicle commits a violation.

11. The non-transitory, computer-readable medium of claim 10, wherein at least one of the plurality of additional member node devices is a traffic camera.

12. The non-transitory, computer-readable medium of claim 8, wherein executing the violation processing logic stated in the smart contract comprises taking punitive measures based on a specific violation type committed by the vehicle.

13. The non-transitory, computer-readable medium of claim 12, wherein the punitive measures comprise at least one of:
    a fine; or
    a penalty point associated with the vehicle.

14. The non-transitory, computer-readable medium of claim 8, the operations further comprising:
    following execution of the smart contract, broadcasting a message to a driver of the vehicle indicating results of the execution of the smart contract.

15. A computer-implemented method for a blockchain-based service, comprising:

collecting appearance data of a vehicle as collected appearance data, the vehicle capable of accessing, as a member, a blockchain;

generating, by generation hardware of the vehicle, a private key;

generating a digital signature of a transaction using the private key, wherein the transaction is used to initiate registration of the vehicle in the blockchain;

verifying the digital signature using the collected appearance data as a public key;

registering, in a distributed database associated with the blockchain, the appearance data as an identity of the vehicle;

detecting, by a member node device in the blockchain, accident event information associated with an accident event that is related to the vehicle;

receiving a target transaction initiated by the member node device in the blockchain, wherein the target transaction comprises the appearance data of the vehicle that is collected by the member node device and the accident event information that is related to the vehicle;

invoking a smart contract that corresponds to the accident event; and executing, based on the identity indicated by the appearance data of the vehicle, vehicle accident liability determining logic stated in the smart contract.

16. The computer-implemented method of claim 15, further comprising:

broadcasting, by the member node device, the accident event information to the blockchain; and performing consensus processing on the accident event information by the blockchain.

17. The computer-implemented method of claim 16, wherein the accident event is detected by a plurality of additional member node devices, and wherein the accident event information comprises information from at least one additional member node device.

18. The computer-implemented method of claim 17, wherein at least one of the plurality of additional member node devices is a traffic camera.

19. The computer-implemented method of claim 15, wherein the smart contract comprises vehicle accident settlement logic, and wherein the vehicle accident settlement logic is executed in response to determining a liability by executing the vehicle accident liability determining logic.

20. The computer-implemented method of claim 19, wherein invoking the smart contract further comprises executing the vehicle accident settlement logic, wherein executing the vehicle accident settlement logic comprises:

determining a settlement payment based on execution of the vehicle accident liability determining logic;

receiving, from a driver of the vehicle, confirmation to pay the settlement payment;

charging, an account of the driver, an amount of the settlement payment; and transmitting a message to an insurance provider of the driver notifying the insurance provider of the settlement payment.

21. The computer-implemented method of claim 15, further comprising following execution of the smart contract, broadcasting a message to a driver of the vehicle indicating results of the execution of the smart contract.

22. A non-transitory, computer-readable medium storing one or more instruction executable by a computer system to perform operations comprising:

collecting appearance data of a vehicle as collected appearance data, the vehicle capable of accessing, as a member, a blockchain;

generating, by generation hardware of the vehicle, a private key;

generating a digital signature of a transaction using the private key, wherein the transaction is used to initiate registration of the vehicle in the blockchain;

verifying the digital signature using the collected appearance data as a public key;

registering, in a distributed database associated with the blockchain, the appearance data as an identity of the vehicle;

detecting, by a member node device in the blockchain, accident event information associated with an accident event that is related to the vehicle;

receiving a target transaction initiated by the member node device in the blockchain, wherein the target transaction comprises the appearance data of the vehicle that is collected by the member node device and the accident event information that is related to the vehicle;

invoking a smart contract that corresponds to the accident event; and executing, based on the identity indicated by the appearance data of the vehicle, vehicle accident liability determining logic stated in the smart contract.

23. The non-transitory, computer-readable medium of claim 22, the operations further comprising:

broadcasting, by the member node device, the accident event information to the blockchain; and performing consensus processing on the accident event information by the blockchain.

24. The non-transitory, computer-readable medium of claim 23, wherein the accident event is detected by a plurality of additional member node devices, and wherein the accident event information comprises information from at least one additional member node device.

25. The non-transitory, computer-readable medium of claim 24, wherein at least one of the plurality of additional member node devices is a traffic camera.

26. The non-transitory, computer-readable medium of claim 22, wherein the smart contract comprises vehicle accident settlement logic, and wherein the vehicle accident settlement logic is executed in response to determining a liability by executing the vehicle accident liability determining logic.

27. The non-transitory, computer-readable medium of claim 26, wherein invoking the smart contract further comprises executing the vehicle accident settlement logic, wherein executing the vehicle accident settlement logic comprises:

determining a settlement payment based on execution of the vehicle accident liability determining logic;

receiving, from a driver of the vehicle, confirmation to pay the settlement payment;

charging, an account of the driver, an amount of the settlement payment; and transmitting a message to an insurance provider of the driver notifying the insurance provider of the settlement payment.

28. The non-transitory, computer-readable medium of claim 22, the operations further comprising:

following execution of the smart contract, broadcasting a message to a driver of the vehicle indicating results of the execution of the smart contract.

29. The computer-implemented method of claim 1, wherein the appearance data of the vehicle is collected by an optical sensor mounted on the vehicle, and wherein the appearance data of the vehicle is solidified by an optical medium applied to an outer surface of the vehicle.

30. The computer-implemented method of claim 29, wherein the optical medium is sprayed on the outer surface of the vehicle, wherein after being sprayed on the outer surface of the vehicle, the optical medium wraps the vehicle to form a circuit that automatically solidifies a shape of the vehicle, and wherein the optical sensor is configured to perform optical sensing on the optical medium.

\* \* \* \* \*